United States Patent [19]

Saruwatari et al.

[11] Patent Number: 5,069,848
[45] Date of Patent: Dec. 3, 1991

[54] EXTRUSION PROCESS OF POLYIMIDE AND POLYIMIDE PELLET USED FOR THE PROCESS

[75] Inventors: Masumi Saruwatari, Nagoya; Syoichi Tsuji, Tanashi; Yasuhiro Fujii, Nagoya, all of Japan

[73] Assignee: Mitsui Toatsu Chemicals, Inc., Tokyo, Japan

[21] Appl. No.: 498,975

[22] Filed: Mar. 26, 1990

[30] Foreign Application Priority Data

Apr. 5, 1989 [JP] Japan .................................. 1-84889

[51] Int. Cl.$^5$ ...................... B29C 47/78; B29C 67/24
[52] U.S. Cl. .................................... 264/118; 264/126; 264/140; 264/141; 264/176.1; 264/234; 264/331.14; 264/331.19
[58] Field of Search ............... 264/118, 126, 140, 141, 264/142, 143, 144, 176.1, 234, 235, 331.12, 331.14, 331.19, 345, 346

[56] References Cited

U.S. PATENT DOCUMENTS

| | | | |
|---|---|---|---|
| 4,238,538 | 12/1980 | Manwiller | 428/36 |
| 4,302,413 | 11/1981 | Howe et al. | 264/126 |
| 4,581,264 | 4/1986 | Emery et al. | 428/36 |
| 4,642,211 | 2/1987 | Elbs et al. | 264/85 |

Primary Examiner—Mary Lynn Theisen
Attorney, Agent, or Firm—Burns, Doane, Swecker & Mathis

[57] ABSTRACT

Polyimide which is obtained by polymerization and consists essentially of recurring structural units of the formula (I):

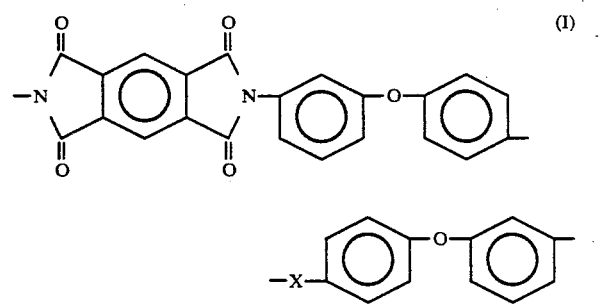

wherein X is a single bond or a hexafluoroisopropylidene group, is processed to a form of pellet, followed by heat-treating to obtain crystallinity of 5% or more, and fed to an extruder to obtain articles.

3 Claims, No Drawings

EXTRUSION PROCESS OF POLYIMIDE AND POLYIMIDE PELLET USED FOR THE PROCESS

BACKGROUND OF THE INVENTION

1. Field of the Invention

The present invention relates to a process for the extrusion of a thermoplastic polyimide and a polyimide pellet used for the process. More particularly, in the extrusion of polyimide, the invention relates to a process which can continuously produce articles without bubbles or die tailings at a constant extrusion rate, that is, an extrusion process for previously crystallizing a polyimide of a specific structure into a specific range of crystallinity and feeding the polyimide to an extruder, and relates to the polyimide pellet used for the process.

2. Prior Art of the Invention

Aromatic polyimides exhibit outstanding heat resistance in comparison with other organic polymers and additionally have excellent mechanical properties, chemical resistance and electrical insulating properties. Hence, aromatic polyimides are widely used in such fields as an electric and electronic industry, mechanical industry, atomic industry and automotive industry.

Thermoplastic polyimides and processing methods thereof have recently been reported.

In these thermoplastic polyimides, polyimides consisting of recurring units represented by the formula (I):

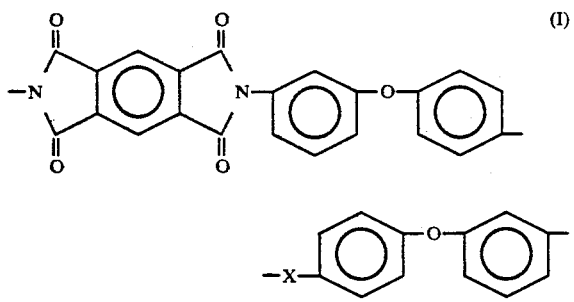

wherein X is a single bond or a hexafluoroisopropylidene group, have been developed to have good extrudability as disclosed, for example, in Japanese Patent Laid-Open Publication SHO 62-205124(1987) and 62-241923(1987).

Some polyimides are thermoplastic and articles such as fibers, films, sheets, electric wires, bars, plates and pipes can be formed by common extrusion processes.

The common extrusion processes, however, have not yet been satisfactory for the production process of these articles from the above polyimides.

The polyimides consisting of recurring units represented by the above formula (I) have better extrudability as compared to other difficultly processable polyimides and are usually processed into pellets and extruded to form articles.

However, when the pellets thus obtained are fed as such to the extruder, extrusion cannot be smoothly operated, bubbles and die tailings are generated even though articles are obtained, and thus it is difficult to manufacture products having uniform quality.

The phenomenon results from the fact that the resin charged to the extruder is subjected to rapid plastization by heat and pressure at the feed zone and/or the compression zone of a screw. The resin sticks to the screw alone and idly slips on the internal surface of the cylinder after a certain number of revolutions of the screw. Thus, the resin cannot be extruded at all in some cases. Even in other cases where the resin is not blocked, a gas, for example, the gas transferred with the rapidly plasticized resin is not removed in the compression zone of the screw where the air shall be essentially excluded. The air thus entrained in the die is found to generate bubbles in the extrudate. For example, in fiber processing, the phenomenon tends to cause problems such as denier variation resulting from fluctuation of the extruded amount and end breakage due to bubble generation. In film and sheet processing, the phenomenon is liable to result in problems such as thickness fluctuation due to variations of the extruded amount and defective appearance or decrease in mechanical strength caused by generation of bubbles and die tailings. Further, in bar and pipe processing, the phenomenon is apt to cause problems such as fluctuation of diameter resulting from variations of the extruded amount, decreases in strength due to generation of internal bubbles and defective appearance, caused by die tailings. Additionally, in wire processing, the phenomenon is liable to cause problems such as reduction of electrical insulation properties due to the generation of bubbles and die tailings.

A countermeasure for these problems is a method for lowering the cylinder temperature of the extruder to 250 C. or less, that is, a temperature for inhibiting rapid plastization of the resin. The method, however, is unfavorable because the viscosity of the molten resin becomes abnormally high and renders extrusion impossible, or leads to deterioration of the resin resulting from a large amount of heat build-up by shear. Another countermeasure considered is modification of screw configuration. However, fluctuation of the extruded amount, that is, so-called surging takes place and renders extrusion impossible in some cases. Hence, it is difficult to solve the problems.

As stated above, the thermoplastic polyimides still have problems to be solved in the extrusion process. Unless these problems are overcome, it will be difficult to obtain articles having the required performance.

SUMMARY OF THE INVENTION

An object of the present invention is to provide an improved extrusion process of polyimides which have excellent mechanical properties, chemical resistance, and electrical insulation properties.

Another object of the present invention is to provide an improved extrusion process which is applicable to polyimide and capable of providing uniform quality articles.

As a result of an intensive investigation which has been carried out in order to achieve the above objects, the present inventors have found the following facts. The polyimide consisting of recurring units represented by the above formula (I) is prepared by polymerization usually in the form of semi-crystallized powder. When the powder is processed into pellets which are the preferred form for being fed to extrusion step, the crystallinity of the polyimide is surprising reduced in the pelletizing step and is unexpectedly converted to a non-crystallized state even in the case of crystallized polyimide starting material. When the non-crystallized pellets are fed to the extruder intact, the above various problems take place. It has also been found that the non-crystallized polyimide in the form of pellets can be converted to a semi-crystallized polyimide by conducting heat treatment at a specific temperature condition. The above various problems have been solved by feeding the semi-crystallized polyimide pellets to the extruder and thus the present invention has been comhydride with 4,4'-bis(3-aminophenoxy)biphenyl or 2,2-bis(3-aminophenoxyphenyl)-1,1,1,3,3,3-hexafluoropropane to prepare a polyamic acid represented by the formula (II):

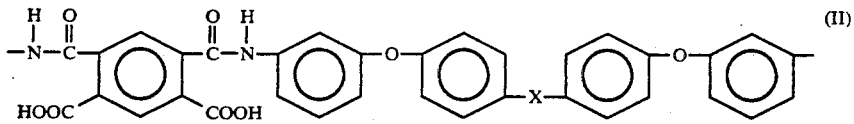

pleted.

That is, one aspect of the present invention is a polyimide pellet used for feeding a polyimide consisting essentially of recurring units represented by the formula (I):

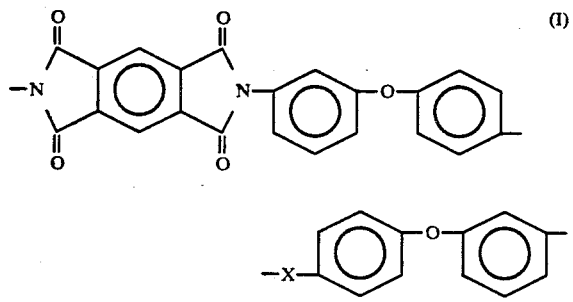

wherein X is a single bond or a hexafluoroisopropylidene group, to an extruder comprising preparing the polyimide by polymerization, processing the polyimide into a pellet by heat-melting, and heat-treating the pellet to provide a crystallinity of 5% or more; and an extrusion process comprising feeding the pelletized polyimide to the extruder.

The present invention has met the above problems for the extrusion of polyimide. That is, the invention provides a process for extruding the polyimide consisting essentially of recurring units represented by the formula (I) wherein fluctuation of the extruded amount and generation of bubbles and die tailings are prevented, thickness variations are reduced and articles having excellent mechanical strength and electrical insulation properties can be continuously produced.

DETAILED DESCRIPTION OF THE INVENTION

The polyimide of the present invention consists of recurring units represented by the formula (I):

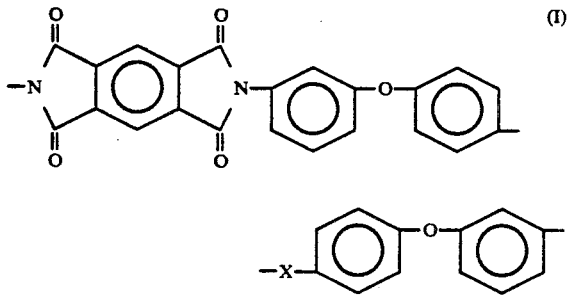

wherein X is a single bond or a hexafluoroisopropylidene group.

The polyimide can be prepared by conducting a dehydrating condensation reaction of pyromellitic dianhydride with 4,4'-bis(3-aminophenoxy)biphenyl or 2,2-bis(3-aminophenoxyphenyl)-1,1,1,3,3,3-hexafluoropropane to prepare a polyamic acid represented by the formula (II):

wherein X is the same as above, and by thermally or chemically imidizing the polyamic acid.

The polyimide powder prepared by the above process is heat-melted as such or after heat-treatment to form pellets, and then the pellets are heat-treated to obtain crystallized polyimide pellets which are fed to the extruder of this invention. In other words, the polyimide powder prepared above is formed into tablets or cylinders as such or after heat-treatment and then the resulting tablets or the cylinders are further heat-treated to give the crystallized polyimide pellets which can be used for the extruder.

The latter method, that is, the method for heat-treating the polyimide powder prior to forming the pellet, prevents contamination of air bubbles into the processed articles and can provide constant quality products.

The polyimide pellet of the present invention is prepared by the extrusion process. The polyimide powder obtained by polymerization is preferably heat-treated at 250° to 370° C. for 1 minute to 50 hours and fed to the extruder. The moisture content of the polyimide is preferably reduced to 200 ppm or less by drying at 120° to 150 C. for 3 to 24 hours before being fed to the extruder. Extrusion is carried out in a temperature range of 300° to 450° C., preferably 350° to 430° C. No particular limitation is imposed upon the diameter of a strand extruded in a molten state. The diameter is generally from 1 to 5 mm. The strand may be cut into pellets after cooling the molten strand by water or the air. Alternatively, the molten strand may be cut without cooling, i.e., so-called hot-cutting, and then cooled by water or the air.

The extruder used may be a common type which is widely used and is preferably equipped with a vent hole or a vacuum hopper.

The thus obtained pellets which were in the semi-crystallized state before processing to pellets have been converted to the non-crystallized state. It is required in the present invention to provide a polyimide pellet having a crystallinity of 5% or more by heat-treating the non-crystallized polyimide pellets.

The heat-treatment is conducted by the following conditions.

The heat-treatment temperature is preferably from 250° to 370° C. When the heat-treatment temperature is less than 250° C., crystallization is extremely slow and practically unfavorable. At temperatures above 370° C., crystallization is still slow, and additionally melt-adhesion or decomposition of resin is unfavorably apt to take place due to melting of the resin. A more preferred temperature range is from 290° to 330° C..

The heat-treatment time depends upon the heat-treatment temperature and crystallinity and is hence not particularly limited. Heat-treatment is generally carried out for 1 minute to 50 hours. Heat-treatment time less than 1 minute does not result in satisfactory crystallization and is unfavorable because fluctuation of the extruded amount, unextrudable state and generation of bubbles occur in the successive step. On the other hand, a heat-treatment time exceeding 50 hours is also unfavorable because heat decomposition takes place and leads to generation of discoloration and development of bubbles in the successive step. Practically preferred heat treatment time in particular is from 30 minutes to 10 hours.

Moreover, the heat-treatment can be performed before and after the pellets are cut from the strand of polyimide.

The polyimide which is used for the present invention and composed of recurring units represented by the formula (I) is subjected to heat-treatment under the above conditions to prepare polyimide pellets having a crystallinity of 5% or more. In order to obtain crystallinity of 5% or more, the heat-treatment temperature may be further increased, the heat-treatment time may be further extended, or the heat-treatment may be repeated twice or more. These procedures sometimes provide preferable results. A degree of crystallinity less than 5% is unfavorable because of fluctuation in the extruded amount, unextrudable state developed and generation of bubbles and die tailings. No particular restriction is put upon the upper limit of crystallinity. The crystallinity of the pellets obtained by the heat-treatment is generally 50% at maximum and preferably in the range of 5 to 50%, more preferably in the range of 10 to 50%.

The heat treatment is preferably carried out by heating in air or an inert gas such as nitrogen, carbon dioxide, helium, neon or argon. The heat-treatment in inert gas is particularly preferred in order to prevent oxidative deterioration of the polyimide. In addition, stirring during the heat-treatment is preferable in view of preventing partial melt-adhesion of the resin.

The crystallinity of the polyimide used for extrusion in this invention is measured by means of a density gradient tube. For example, a molten polyimide is quenched to obtain a non-crystallized polyimide. The density of the non-crystallized polyimide is measured.

The density of crystallized polyimide is measured in advance by X-ray diffractometry and structural analysis. The density of a polyimide sample is measured and the crystallinity of the sample is calculated from the following equation (I):

$$\text{Crystallinity} = \frac{\text{Sample density} - \text{Noncrystal density}}{\text{Crystal density} - \text{Noncrystal density}} \times 100(\%) \quad \text{(III)}$$

The polyimide of the formula (I) may contain inorganic fillers such as carbon and glass fibers or additives such as pigments in the range not remarkably inhibiting the crystallinity.

In the process of the present invention, the crystalline polyimide which is prepared as above and has a crystallinity of 5% or more is fed to a well known extruder, heat-melted, extruded through a die and cooled to solidify into the form of a fiber, film, sheet, covered wire, plate, bar and pipe.

In the above procedures, the polyimide pellets are preferably treated to reduce the moisture content to 200 ppm or less before feeding to the extruder. No particular restriction is imposed on the method for reducing the moisture content of polyimide to 200 ppm or less. Generally, the polyimide is maintained at a temperature above 100° C. and below the melting point of the polyimide, i.e., usually lower than 250° C., for 3 to 24 hours. It is also effective to replace the atmosphere with the air or nitrogen. The treatment may also be carried out under reduced pressure.

The processing temperature in the extruder is in the range of 300° to 450° C., preferably 350° to 430° C. When the processing temperature is lower than 300° C., the resin cannot be melted and extrusion is difficult to carry out. A processing temperature exceeding 450° C. accelerates resin decomposition, develops decomposition bubbles, die lines and decomposition tailings and unfavorably impairs appearance and performance of the final products.

The extruder may be any conventional type which is widely used in industry. A vented extruder or an extruder equipped with a vacuum hopper is preferably used.

The present invention will hereinafter illustrated further in detail by way of examples.

The properties of polyimide described in the examples were measured by the following methods.

(1) Glass Transition Temperature and Melting Point

Glass transition temperature (Tg) and melting point (Tm) were measured by DSC method. The sample used was about 10 mg. Measurement was conducted at a temperature rise rate of 4 ° C./min. Tm was defined as the peak temperature of the melting curve.

(2) Melt Viscosity

Melt viscosity was measured with a KHOKA(-Polymer Society of Japan)type flow tester. An apparent shear rate at 200 sec$^{-1}$, and an apparent viscosity at 200° C. were calculated.

(3) Crystallinity

Density (Xobs) at 23° C. was measured by the method of density gradient tube using a toluene/carbon tetrachloride mixture. Crystallinity (X) was calculated from non-crystal density (Xam) and Crystal density (Xcr) by using the following equation.

$$\text{Crystallinity}(X) = \frac{Xobs - Xam}{Xcr - Xam} \times 100(\%)$$

Synthesis Example 1 had a crystal density of 1.459 g/cm$^3$ and a non-crystal density of 1.327 g/cm$^3$, and Synthesis Example 2 had a crystal density of 1.438 g/cm$^3$ and a non-crystal density of 1.292 g/cm$^3$.

SYNTHESIS EXAMPLE 1

To a reactor equipped with a stirrer, a reflux condenser and a nitrogen inlet tube, 368.4 g (1 mole) of 4,4'-bis(3-aminophenoxy) biphenyl and 2344 g of N,N-dimethylacetamide were charged. Under a nitrogen atmosphere, 218.1 g (1 mole) of pyromellitic dianhydride was added by portions with caution to prevent a temperature rise of the solution and stirred for about 20 hours at room temperature. To the polyamic acid solution thus obtained, 30.3 g (0.3 mole) of triethylamine and 30.6 g (0.3 mole) of acetic anhydride were added over about 30 minutes, and then stirred for about 30 minutes. To the solution thus obtained, 2000 g of methanol was added and precipitated polyimide powder was filtered at 30° C. The polyimide powder obtained was washed with methanol and acetone and dried at 300° C. for 8 hours under a nitrogen atmosphere. The polyimide powder thus obtained was 517 g and had a Tg of 248° C., Tm of 386° C. and a melt viscosity of 4500 poise. The powder was a crystalline resin and had a crystallinity of 35%.

The polyimide powder was dried at 180° C. for 24 hours and then fed to a vented extruder of 25 mm in diameter, melted at 410° C., delivered from a nozzle having a diameter of 2 mm, and allowed to cool to obtain a strand having a diameter of about 1.8 mm. The strand was cut into pellets having a length of about 3 mm.

The polyimide pellets had a cooling crystallization peak (Tcc) of 296° C. by DSC method and a density of 1.327 g/cm$^3$. The pellets were non-crystalline and had a crystallinity of 0%. The pellets were referred to as polyimide A.

SYNTHESIS EXAMPLE 2

To a reaction vessel equipped with a stirrer, a reflux condenser and a nitrogen inlet tube, 259.2 g (0.5 mole) of 4,4'-bis(3-aminophenoxyphenyl)-1,1,1,3,3,3-hexafluoropropane and 1713 g of m-cresol were charged. Under a nitrogen atmosphere, 109.1 g (0.5 mole) of pyromellitic dianhydride was added by portions with caution to prevent a temperature rise of the solution and stirred for about 2 hours. Successively, the reaction mixture was warmed under a nitrogen atmosphere. The mixture turned to an orange transparent solution at about 60° C., and was further heated to increase the temperature. After stirring the solution at 150° C. for an hour, a light yellow polyimide powder started to precipitate. After stirring for 5 hours under heating, the reaction mixture was filtered to obtain polyimide powder. The powder was washed with methanol and acetone, dried at 180° C. for 24 hours under reduced pressure, and further dried at 300° C. for 8 hours under a nitrogen atmosphere. The polyimide powder thus obtained was 319 g and had a Tg of 271° C., Tm of 390° C. and a melt viscosity of 6500 poise. The powder was a crystalline resin and had a crystallinity of 28%.

The polyimide powder thus obtained was dried at 180° C. for 24 hours, fed to a vented extruder of 25 mm in diameter, melted at 410° C., delivered from a nozzle having a diameter of 2 mm, and allowed to cool to obtain a strand having a diameter of about 1.8 mm. The strand was cut into pellets having a length of about 3 mm. The polyimide pellets obtained had a cooling crystallization peak (Tcc) of 296° C. and a density of 1.292 g/cm$^3$. The pellets were non-crystalline and a crystallinity of 0%. The pellets were referred to as polyimide B.

SYNTHESIS EXAMPLE 3

The polyimide pellets were prepared by the same procedures as carried out in Synthesis Example 1 except that 400.5 g (1 mole) of 4,4'-bis(3-aminophenoxyphenyl) sulfide was used in place of 4,4'-bis(3-aminophenoxy)biphenyl. The pellets had a glass transition temperature (Tg) of 230° C. and had no crystalline melting point. The pellets were referred to as polyimide C.

EXAMPLES 1-5

A stainless steel vessel was charged with 2 kg of polyimide A and placed in a sealed type hot air drying oven. The drying oven is thoroughly replaced with nitrogen and heat-treatment was carried out at 310° C. for 5 hours at a nitrogen flow rate of 1 l/min and then cooled to the room temperature. The crystallinity of the pellets after treatment was 31% by the density method.

The pellets thus obtained were dried at 180° C. for 24 hours fed to a vacuum hopper of an extruder having a diameter of 25 mm, heat-melted at 410° C., delivered from a slit die having a width of 150 mm and a gap of 0.5 mm, and allowed to cool in air to obtain a sheet having a thickness of about 0.5 mm. The rotation number of the screw was varied in the range of 5 to 150 rpm as illustrated in Table 1. Nothing was found on the problems such as fluctuation of extrusion amount and generation of bubbles. Results are illustrated in Table 1.

The fluctuation of extruded amount is indicated by variation degree: Variation degree=(maximum extruded amount-minimum extrusion amount)÷(average extruded amount)×100(%)

EXAMPLES 6-10

Polyimide A was heat-treated in air by changing temperature and time. The pellets were taken out Of the oven immediately after heat-treatment and cooled with stirring by blowing the air of the room temperature. Thus, five kinds of pellets having different crystallinity were obtained. Sheets were prepared from these pellets by using the same procedures as conducted in Example 2. As a result, nothing was found on the problems such as fluctuation of the extruded amount and evolution of bubbles. Results are illustrated in Table 1.

COMPARATIVE EXAMPLES 1-5

Heat-treatment of polyimide A was omitted. The intact polyimide A was extruded into a sheet by using the same procedures as conducted in Example 1 except that the screw had a rotation number illustrated in Table 1. As a result, fluctuation of extrusion amount, unextrudable state and generation of bubbles were found. Results are illustrated in Table 1.

COMPARATIVE EXAMPLE 6

Polyimide A was heat-treated under the conditions illustrated in Table 1 to obtain pellets having a crystallinity of 3.5%. The pellets were extruded into sheets by the same procedures as conducted in Example 2. As a result, fluctuation of the extruded amount and generation of bubbles were found. Results are illustrated in Table 1.

EXAMPLE 11

The pellets were heat-treated by the same procedures as conducted in Example 2. A monofilament was prepared by the same procedures as conducted in Example 2 except that a nozzle having a diameter of 0.3 mm was fitted on the extruder and the extrudate was taken off at a rate of 2 m/min. As a result, the monofilament had an average extrusion rate of 7.5 g/min and a degree of variability of 3%. Thus, fluctuation of the extruded amount was small. Further, end breakage was not found.

COMPARATIVE EXAMPLE 7

Preparation of a monofilament was tried by the same procedures as conducted in Example 11 except that polyimide A was used without heat treatment. As a result, end breakage occurred frequently and a monofilament could not be obtained.

EXAMPLE 12

A round bar having a diameter of 20 mm was prepared by using the same pellets as used in Example 2 and a nozzle having a diameter of 20 mm, and passing the extrudate through a sizing die maintained at about 50° C. As a result, the bar had a variation degree in diameter of about 5%, contained no bubbles and was good in appearance.

COMPARATIVE EXAMPLE 8

Preparation of a round bar was tried by the same procedures as conducted in Example 12 except that polyimide A was used. However, a marked variation of the extruded amount was found. Extremely large amount of bubbles were also generated in the extrudate and the form of a bar could hardly be obtained.

EXAMPLE 13

Polyimide B was heat-treated in an nitrogen atmosphere at 260° C. for 28 hours and at 310° C. for 5 hours to obtain crystalline pellets having a crystallinity of 23%.

The pellets thus obtained was dried at 180° C. for 24 hours, fed to an extruder having a diameter of 25 mm, heat-melted at 400° C., delivered from a slit die having a width of 150 mm and a gap of 0.5 mm, and allowed to cool in air to obtain a sheet having a thickness of about 0.5 mm. The extrusion was carried out at a screw rotation rate of 10 rpm. Variation degree of the extruded amount was 3% and problems such as bubble generation were not found at all.

EXAMPLES 14–16

Polyimide B was heat-treated by the same procedures as conducted in Example 1 except that conditions (temperature and time) as illustrated in Table 2 were used to obtain three kinds of pellets having different crystallinity.

These kinds of pellets were dried at 180° C. for 24 hours, fed to an extruder having a diameter of 25 mm, heat-melted at 400° C., delivered from a slit die having a width of 150 mm and a gap of 0.5 mm and allowed to cool in the air to obtain a sheet having a thickness of about 0.5 mm. The extrusion was carried out at a screw rotation rate of 10 rpm. Problems such as fluctuation of extruding amount and generation of bubbles were not found at all. Results are illustrated in Table 1.

COMPARATIVE EXAMPLES 9–10

In Comparative Example 9, polyimide B was heat-treated at 280° C. for 5 minutes by the same procedures as conducted in Example 1 to obtain pellets having crystallinity of 2.5%. In Comparative Example 10, polyimide B was used without heat treatment. The two kinds of pellets were extruded by the same procedures as conducted in Example 14 to obtain sheets. However, fluctuation of the extruded amount and generation of bubbles were found. Results are illustrated in Table 1.

EXAMPLE 17

A monofilament was prepared from the pellets used in Example 13 by carrying out the same procedures as conducted in Example 2 except that a nozzle having a diameter of 0.3 mm was fitted on the extruder and the extrudate was taken off at a rate of 2 m/min. As a result, an average extrusion amount of 6.8 g/min and a variation degree of 6% were obtained. Thus, fluctuation of the extruded amount was small and problem of end breakage was also not found.

COMPARATIVE EXAMPLE 11

Preparation of a monofilament from polyimide B was tried by the same procedures as conducted in Example 17.

As a result, end breakage frequently occurred and a monofilament could not be obtained.

EXAMPLE 18

A round bar having a diameter of 20 mm was prepared from the pellets used in Example 13 by using a nozzle having a diameter of 20 mm and passing the extrudate through a sizing die maintained at about 50° C. As a result, the round bar had a variation degree in diameter of about 8%, contained no bubbles and was good in appearance.

COMPARATIVE EXAMPLE 12

Preparation of a round bar from polyimide B was tried by carrying out the same procedures as conducted in Example 18. However, marked fluctuation was found in the extruded amount and the extrudate contained a remarkable amount of bubbles. Thus, the bar could hardly be formed.

COMPARATIVE EXAMPLE 13

Polyimide C was heat-treated at 250° C. for 48 hours in a nitrogen atmosphere, and then its crystallinity was measured by DSC method and X-ray diffraction method. However, no crystallinity was found.

The heat-treated polyimide C was dried at 180° C. for 24 hours and extruded to form a sheet by the same procedure as conducted in Example 2. As a result, an average extruded amount of 7.5 g/min, and a variation degree of 53% were obtained. Thus, the sheet had large fluctuation in the extruded amount and also contained bubbles and die tailings.

TABLE 1

| | Heat-treatment | | Crystal- | Screw | Extruded amount | | Appearance | |
|---|---|---|---|---|---|---|---|---|
| | Temperature (°C.) | Time (min) | linity (%) | rotation (rpm) | Average (g/min) | Variation degree (%) | Bubble | Die tailings |
| Example 1 | 310 | 300 | 31 | 5 | 4.5 | 8 | None | None |
| Example 2 | " | " | " | 10 | 8.0 | 4 | " | " |
| Example 3 | " | " | " | 20 | 15.2 | 3 | " | " |
| Example 4 | " | " | " | 40 | 29.4 | 2 | " | " |
| Example 5 | " | " | " | 150 | 100.4 | 1 | " | " |
| Example 6 | 280 | 10 | 5.3 | 10 | 6.6 | 15 | Few | Trace |
| Example 7 | 280 | 50 | 11.5 | 10 | 7.8 | 8 | None | None |
| Example 8 | 310 | 10 | 18.8 | 10 | 8.1 | 7 | " | " |
| Example 9 | 310 | 15 | 25.4 | 10 | 8.3 | 5 | " | " |
| Example 10 | 360 | 100 | 35.1 | 10 | 8.3 | 2 | " | " |
| Comparat. Example 1 | — | — | 0 | 5 | 2.5 | 130 | Many (Unextrudable) | Found |

TABLE 1-continued

| | Heat-treatment | | Crystal-linity (%) | Screw rotation (rpm) | Extruded amount | | Appearance | |
| --- | --- | --- | --- | --- | --- | --- | --- | --- |
| | Temperature (°C.) | Time (min) | | | Average (g/min) | Variation degree (%) | Bubble | Die tailings |
| Comparat. Example 2 | — | — | 0 | 10 | 4.5 | 85 | Many | " |
| Comparat. Example 3 | — | — | 0 | 20 | 10.6 | 70 | Many | Found |
| Comparat. Example 4 | — | — | " | 40 | 26.4 | 30 | Some | " |
| Comparat. Example 5 | — | — | " | 150 | 90.3 | 25 | Few | " |
| Comparat. Example 6 | 270 | 10 | 3.5 | 10 | 3.6 | 20 | Many | " |
| Example 13 | 310 | 300 | 23 | 10 | 9.0 | 3 | None | None |
| Example 14 | " | 20 | 15 | " | 9.2 | 4 | " | " |
| Example 15 | 300 | 30 | 9 | " | 9.0 | 6 | " | " |
| Example 16 | 290 | 10 | 5.5 | " | 8.5 | 8 | " | " |
| Comparat. Example 9 | 280 | 5 | 2.5 | " | 8.3 | 30 | Many | Found |
| Comparat. Example 10 | — | — | 0 | " | 4.5 | 100 | Few | Trace |

Note: (a) Variation degree = (maximum extruded amount − minimum extruded amount) ÷ (average extrusion amount) × 100(%)

What is claimed is:

1. A process for extruding polyimide comprising the steps of pelletizing a polyimide consisting essentially of recurring structural units represented by the formula (I)

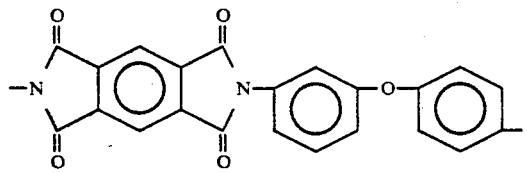

(I)

-continued

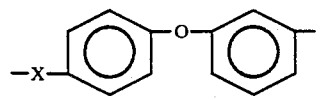

wherein X is a single bond or a hexafluoroisopropylidene group, conducting heat-treatment of the resulting pellets to obtain a crystalline polyimide having a crystallinity of 5% or more and feeding the crystalline polyimide pellets to an extruder.

2. The process of claim 1 wherein the heat-treatment is conducted at a temperature of from 250° to 370° C.

3. The process of claim 1 wherein the crystallinity is from 5 to 50%.

* * * * *